(12) United States Patent
Yamashita

(10) Patent No.: US 6,593,874 B2
(45) Date of Patent: Jul. 15, 2003

(54) RADAR FOR DETECTING THE DISTANCE TO A TARGET

(75) Inventor: Sadao Yamashita, Kyoto-fu (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 0 days.

(21) Appl. No.: 10/083,333

(22) Filed: Feb. 25, 2002

(65) Prior Publication Data

US 2002/0154051 A1 Oct. 24, 2002

(30) Foreign Application Priority Data

Mar. 6, 2001 (JP) ........................................ 2001-061883

(51) Int. Cl.[7] .............................................. G01S 13/34
(52) U.S. Cl. .......................... 342/118; 342/70; 342/92; 342/128; 342/192; 342/195; 342/196
(58) Field of Search .............................. 342/118, 70, 71, 342/72, 90, 91, 19, 92–99, 192, 196, 128, 135

(56) References Cited

U.S. PATENT DOCUMENTS

| | | | |
|---|---|---|---|
| 4,733,239 A | | 3/1988 | Schmitt |
| 4,933,641 A | * | 6/1990 | Hsiung et al. ............... 327/351 |
| 5,247,306 A | | 9/1993 | Hardange et al. |
| 5,361,072 A | * | 11/1994 | Barrick et al. ............... 342/133 |
| 5,914,683 A | * | 6/1999 | O'Conner .................... 342/127 |
| 6,400,308 B1 | * | 6/2002 | Bell et al. ...................... 342/71 |
| 6,404,378 B1 | * | 6/2002 | Solbach ........................ 342/70 |

FOREIGN PATENT DOCUMENTS

| | | |
|---|---|---|
| EP | 0 348 036 | 5/1989 |
| GB | 2 237 470 | 5/1991 |
| JP | 1996-345407 | 12/1994 |
| JP | 777575 | 3/1995 |
| JP | 7151851 | 6/1995 |
| JP | 8-160122 | 6/1996 |
| JP | 8211144 | 8/1996 |
| JP | 8334557 | 12/1996 |
| JP | 10142322 | 5/1998 |

OTHER PUBLICATIONS

J.C. Marchais, "l'amplificateur operationnel et ses applications," 1981, pp. 104–106.
European Search Report dated Jan. 21, 2003.

* cited by examiner

Primary Examiner—Thomas H. Tarcza
Assistant Examiner—Isam Alsomiri
(74) Attorney, Agent, or Firm—Dickstein, Shapiro, Morin & Oshinksy, LLP.

(57) ABSTRACT

In a radar, a frequency-modulated transmission signal whose frequency varies in time is generated. The gain-frequency characteristics of an IF signal which represents a beat signal between the transmission signal and a reception signal has its peak at or below one half of the sampling frequency of an AD converter. The gain-frequency characteristics of an IF amplifier circuit is determined so that the gain increases as the frequency increases at or below the frequency corresponding to the peak, the ratio of change in the gain relative to change in the frequency becomes smaller at short distances for which a saturation of a mixer is caused, and the gain is reduced at DC and in the vicinity of DC.

16 Claims, 7 Drawing Sheets

ONE HALF OF SAMPLING FREQUENCY

GAIN $f_{IFmax}$

Freq

MAXIMUM DETECTION DISTANCE

MAXIMUM DETECTION DISTANCE

RADAR FOR DETECTING THE DISTANCE TO A TARGET

BACKGROUND OF THE INVENTION

1. Field of the Invention

The present invention relates to a radar for detecting a vehicle, etc. using, for example, electromagnetic waves in the millimeter-wave band.

2. Description of the Related Art

Generally, the strength S of a reception signal received by a radar varies in accordance with distance. The relationship between the strength S of a signal received by a radar and the distance can be expressed by the following radar equation:

$$S=(PG^2\lambda^2\sigma)/((4\pi)^3 R^4 \times L)$$

where P denotes the output power, G denotes the antenna gain, $\lambda$ denotes the wavelength, $\sigma$ denotes the scattering cross-section, R denotes the distance, and L denotes the propagation loss.

Thus, the strength S of a signal received by a radar is inversely proportional to $R^4$; therefore, when the radar is used over a large range from a short distance to a long distance, the strength S varies in a wide range in accordance with the distance of a target from an antenna.

A beat signal obtained by mixing a reception signal and a transmission signal provides an intermediate-frequency signal (IF signal), and the strength of the IF signal is proportional to that of the reception signal. In order to allow detection at a long distance, the gain of an amplifier circuit for amplifying the IF signal must be increased in order to compensate for the decrease in the strength of the reception signal. However, if the gain of the amplifier circuit is too large, when a signal received from a short distance is amplified, the amplified signal exceeds the input range of an analog to distal (AD) converter, causing an overflow.

In order to prevent the overflow of the AD converter, proposals have been disclosed including (1) Japanese Unexamined Patent Application Publication No. 7-151851 in which an amplifier circuit has an AGC (automatic gain control) capability; (2) Japanese Unexamined Patent Application Publication No. 8-334557 in which an antenna has an AGC capability; and (3) Japanese Unexamined Patent Application Publication No. 8-211144 in which an amplifier circuit or a transmission circuit has an AGC capability.

However, such an AGC capability can only be implemented by adding complex circuitry, increasing the overall size and incurring additional cost. Furthermore, because AGC is usually achieved by a loop or feedback control, a sufficient AGC is not achieved against an instantaneous change in the strength of reception signal due to the effect of the time constant of the control loop.

Other proposals include:

(4) Japanese Unexamined Patent Application Publication No. 10-142322 and (5) Japanese Unexamined Patent Application Publication No. 7-77575 which each disclose a radar which generates a frequency-modulated transmission signal whose frequency varies with time, and which detects a distance to a target based on the beat frequency, wherein the gain of an amplifier circuit is varied in accordance with the beat frequency, considering that the strength of a signal received from a long distance is weak.

Generally, the level of a noise signal generated within an amplifier increases in proportion to the passband width of the amplifier. An amplifier circuit for amplifying an IF signal in a radar requires a high SN ratio in order to amplify a weak signal. However, if the gain of an amplifier increases as the frequency of the input signal increases, as in (4) and (5) described above, because the level of a noise signal in an output signal of the amplifier is proportional to the square root of the passband width, the noise signal increases and the SN ratio is thus degraded.

The amplified IF signal is converted into digital data in an AD converter. If a frequency component at or above one half of the sampling frequency is present in an input signal to the AD converter, a problem occurs. That is, the frequency components at or above one half of the sampling frequency are folded over and superposed on the frequency components lower than the center frequency of the sampling frequency, causing a detection of a false image.

Furthermore, in the lower range of IF frequencies corresponding to short distances, the gain is decreased, inhibiting detection of small targets.

Furthermore, the radars disclosed in (4) and (5) do not specify how to handle DC components and low-frequency components in the vicinity of DC in the IF signal. With regard to the DC component and low-frequency components in the vicinity of DC in the IF signal, there have been problems to be solved as follows.

To a local signal input terminal of a mixer, a weak transmission signal (a leakage signal from a circulator) is provided, and to an RF signal input terminal of the mixer, a weak transmission signal Tm reflected or transmitted within the radar apparatus, as well as a reception signal S from a target, are provided. When compared in terms of power level, reflection by an antenna radiator is usually much larger than propagation loss, and thus Tm is considerably larger than S.

When a weak transmission signal is input to the local signal input terminal of the mixer and Tm is input to the RF input terminal of the mixer as described above, it is equivalent to the input of a reflection signal from a very short distance, generating a DC component.

Furthermore, a high-frequency signal generated by a voltage-controlled oscillator VCO for generating a transmission signal causes noise signals in the vicinity of the carrier frequency, due to thermal noise, flicker noise in semiconductors, etc. These types of noise signals are referred to as a sideband noise signal and a phase noise signal.

If a frequency-modulated signal including the sideband noise signal or the phase noise signal is input to the local signal input terminal or the RF signal input terminal of the mixer, a noise signal is generated in the vicinity of DC.

The DC and the noise signal in the vicinity of DC, superposed on the IF signal, may reduce the sensitivity of the radar, degrade SN ratio, and cause an erroneous detection.

SUMMARY OF THE INVENTION

Accordingly, it is an object of the present invention to provide a radar in which the problems described above are overcome by determining the frequency characteristics of an amplifier circuit for amplifying an IF signal as appropriate.

The present invention, in one aspect thereof, provides a radar for detecting the distance to a target based on the frequency difference between a transmission signal and a reception signal. The radar includes a transmission circuit for generating a frequency-modulated transmission signal whose frequency varies in time; a mixer circuit for generating an IF signal representing the frequency difference between a reception signal and the transmission signal; an amplifier circuit for amplifying the IF signal, the gain thereof having its peak at or below one half of a sampling frequency of an AD converter coupled to the output of the amplifier circuit, preferably at the frequency of an IF signal corresponding to a maximum detection distance; and the AD converter sampling the IF signal at a predetermined sampling frequency and converting from analog to digital. The maximum detection distance means the longest detection distance set in or expected for the radar.

Accordingly, the frequency range of a signal which is input to the amplifier circuit is restricted, so that the SN ratio is improved.

The present invention, in another aspect thereof, provides a radar for detecting the distance to a target based on the frequency difference between a transmission signal and a reception signal. The radar includes a transmission circuit for generating a frequency-modulated transmission signal whose frequency varies in time; a mixer circuit for generating an IF signal representing the frequency difference between a reception signal and the transmission signal; an amplifier circuit for amplifying the IF signal; a DC blocking circuit provided at the input of the amplifier circuit; and an offset circuit for adding a predetermined DC offset, provided at the output of the amplifier circuit.

Accordingly, undesirable effects of the DC component and noise signal components in the vicinity of DC, superposed on the IF signal, are avoided, preventing reduction in sensitivity, degradation of SN ratio, and erroneous detection.

The present invention, in yet another aspect thereof, provides a radar for detecting the distance to a target based on the frequency difference between a transmission signal and a reception signal. The radar includes a transmission circuit for generating a frequency-modulated transmission signal whose frequency varies in time; a mixer circuit for generating an IF signal representing the frequency difference between a reception signal and the transmission signal; an amplifier circuit for amplifying the IF signal, the gain thereof having its peak at or below one half of a sampling frequency of an AD converter coupled to an output of the amplifier circuit; the AD converter sampling the IF signal at a predetermined sampling frequency and converting from analog to digital; a first DC blocking circuit provided at the input of the amplifier circuit; a second DC blocking circuit provided at the output of the amplifier circuit; and an offset circuit, provided at the output of the amplifier circuit, for adding a predetermined DC offset to a signal from which the DC component has been removed by the second DC cutting circuit.

The gain of the amplifier circuit preferably increases as the frequency rises in a range of at or below one half of the sampling frequency, preferably in a frequency range of the IF signal corresponding to distances not longer than a maximum detection distance.

Accordingly, as opposed to the related art, complex circuitry such as an AGC circuit is not required, serving to reduce the overall size and cost. Furthermore, unlike AGC circuits, an instantaneous change in the strength of the reception signal can be properly dealt with.

In a frequency range of the IF signal in which the output signal of the mixer saturates as the distance to the target becomes shorter, within a maximum allowable range of input voltage to an AD converter for converting an output signal from the amplifier circuit into digital data, the ratio of change in the gain of the amplifier relative to change in the frequency is preferably made smaller.

Accordingly, the gain at short distances are made relatively larger so as to improve sensitivity, whereby the problem of relative insufficiency in sensitivity at short distances due to a saturation of the mixer is prevented. Thus, a target at a short distance can be accurately detected.

BRIEF DESCRIPTION OF THE DRAWING(S)

DETAILED DESCRIPTION OF EMBODIMENTS OF THE INVENTION

The construction of a radar according to a first embodiment will now be described with reference to FIGS. 1 to 5.

Figure 1:
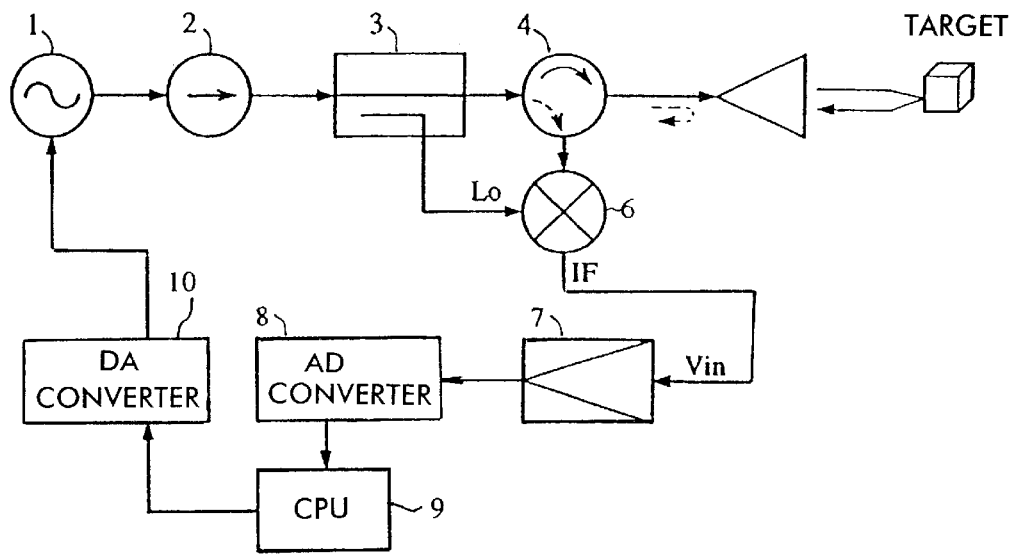
FIG. 1 is a block diagram showing the overall construction of a radar according to a first embodiment.

FIG. 1 is a block diagram showing the overall construction of the radar. Referring to FIG. 1, a voltage-controlled oscillator VCO1 changes the oscillation frequency in accordance with a control voltage output from a DA converter 10. An isolator 2 transmits an oscillation signal from the VCO1 to a coupler 3, inhibiting a reflection signal from being input to the VCO1. The coupler 3 transmits a signal from the isolator 2 to a circulator 4, and feeds a predetermined ratio of a transmission signal to a mixer 6 as a local signal Lo. The circulator 4 transmits the transmission signal to an antenna 5, and feeds a reception signal from the antenna 5 to the mixer 6.

The antenna 5 transmits the continuous-wave transmission signal frequency modulated by the VCO1, and receives a reflection signal from the same direction. The antenna 5 also periodically changes the direction of beams over a range of detection angle.

The mixer 6 mixes the local signal Lo from the coupler 3 and the reception signal from the circulator 4 to output an intermediate-frequency signal IF. An IF amplifier circuit 7 amplifies the intermediate frequency signal by a predetermined gain in accordance with the distance. An AD converter 8 converts the voltage signal into digital data, which is fed to a CPU 9. The CPU 9 calculates the distance of a target from the radar and the velocity of the target relative to the radar by a process to be described later. The CPU 9 also sequentially outputs digital data of the modulated signal to the DA converter 10, so that the VCO1 modulates the oscillation frequency continuously like a triangular waveform.

Figure 2:
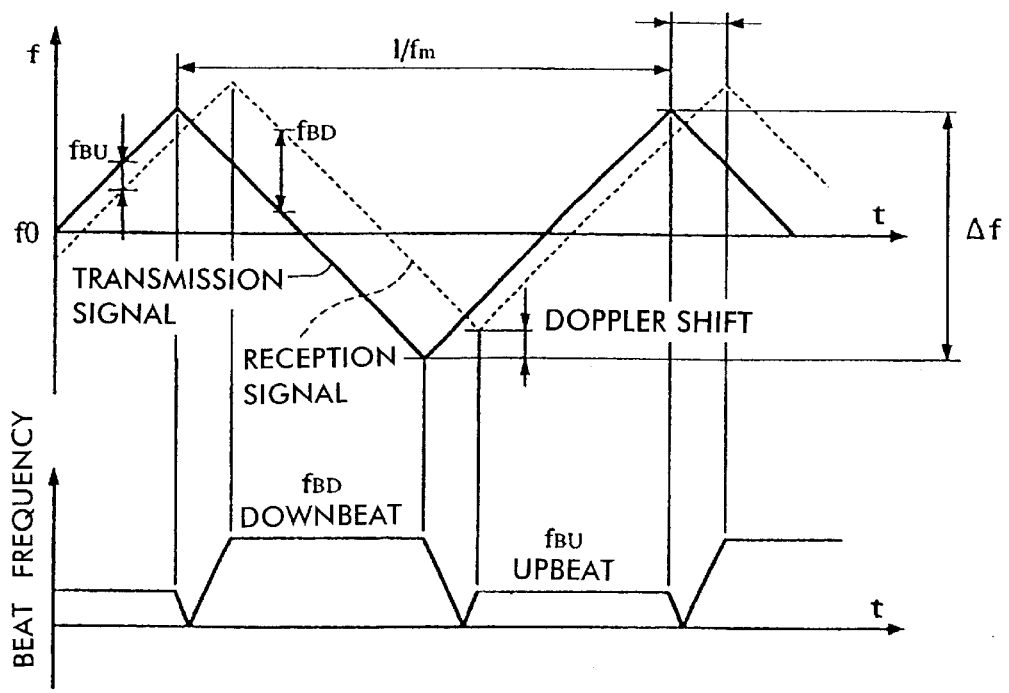
FIG. 2 is a graph showing an example of the frequencies of a transmission signal and a reception signal varying in accordance with the distance of a target from the radar and the velocity of the target relative to the radar.

FIG. 2 shows an example of deviation between the frequencies of the transmission signal and the reception signal due to the distance and relative velocity of the target. The upbeat frequency $f_{BU}$ represents the difference between the frequencies of the transmission signal and the reception signal while the frequency of the transmission signal is rising, and the downbeat frequency $f_{BD}$ represents the difference between the frequencies of the transmission signal and the reception signal when the frequency of transmission signal is falling. The deviation (time difference) between the triangular waves of transmission signal and reception signal along the time axis corresponds to the returning time of the electromagnetic waves from the antenna to the target. The deviation between the transmission signal and the reception signal along the frequency axis represents the amount of Doppler shift associated with the velocity of the target relative to the antenna. The upbeat frequency fBU and the downbeat frequency fBD vary in accordance with the time difference and the amount of Doppler shift. Thus, the distance of the target from the radar and the velocity of the target relative to the radar can be calculated by detecting the upbeat frequency fBU and the downbeat frequency fBD.

Generally, in an FMCW radar, the frequency of an IF signal, $f_{IF}$, at a relative velocity of zero, is expressed as:

$$f_{IF}=f_T-f_R$$

$$f_R=(4\times\Delta F\times fm\times R)/C$$

where $f_T$ denotes the transmission frequency, $f_R$ denotes the reception frequency, $\Delta$ denotes the width of frequency modulation, fm denotes the repetition frequency, R denotes the distance, and C denotes the speed of light.

Furthermore, when the velocity of the target relative to the radar is denoted by V, the Doppler shift frequency fd is expressed as:

$$fd=(2f_T/C)V$$

When V=0, ΔF=300 MHz, and fm=625 Hz, $f_{IF}$ is 2.5 kHz if the distance is 1 m, and $f_{IF}$ is $_{375}$ kHz if the distance is 150 m.

Figure 3:
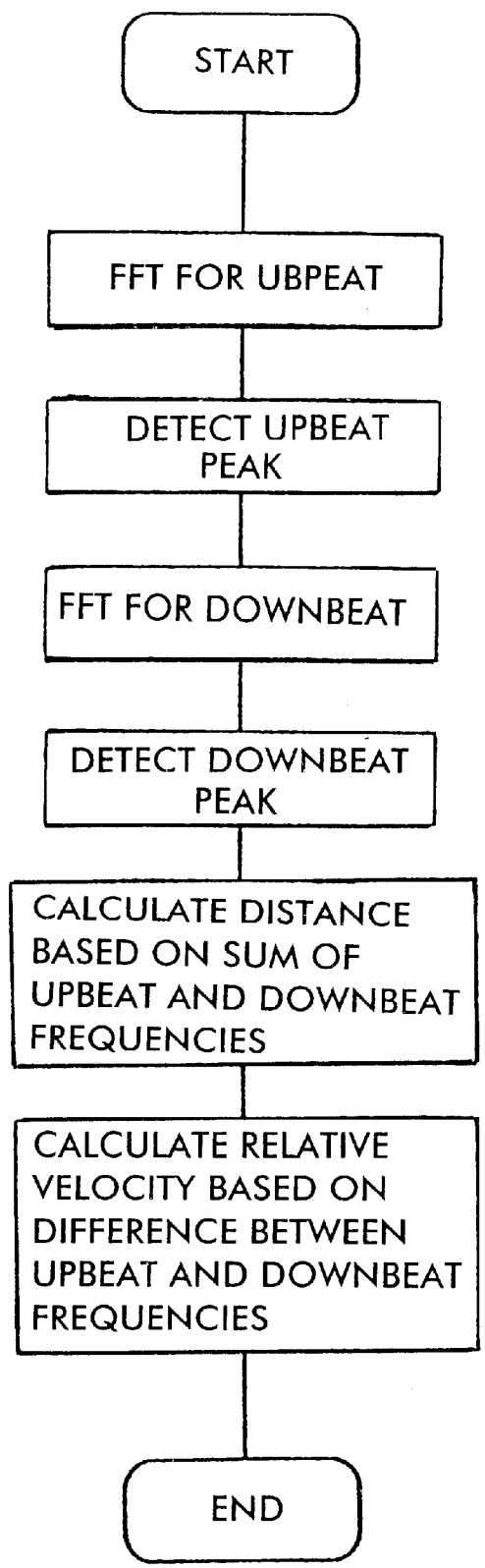
FIG. 3 is a flowchart showing a procedure for detecting the distance and the relative velocity.

FIG. 3 is a flowchart showing a procedure to be executed by the CPU 9 shown in FIG. 1 to determine the distance and the relative velocity. First, data sampled at a timing when an upbeat is generated, is processed by FFT (Fast Fourier Transform) to determine frequency components in an upbeat period. A frequency corresponding to the peak of the frequency components is detected as an upbeat frequency.

Similarly, data sampled at a timing when a downbeat is generated, is processed by FFT to determine frequency components in a downbeat period. A frequency corresponding to the peak of the frequency components is detected as a downbeat frequency.

Then, the distance of the target from the radar is calculated based on the sum of the upbeat frequency and the downbeat frequency. Also, the velocity of the target relative to the radar is calculated based on the difference between the upbeat frequency and the downbeat frequency.

Figure 4:
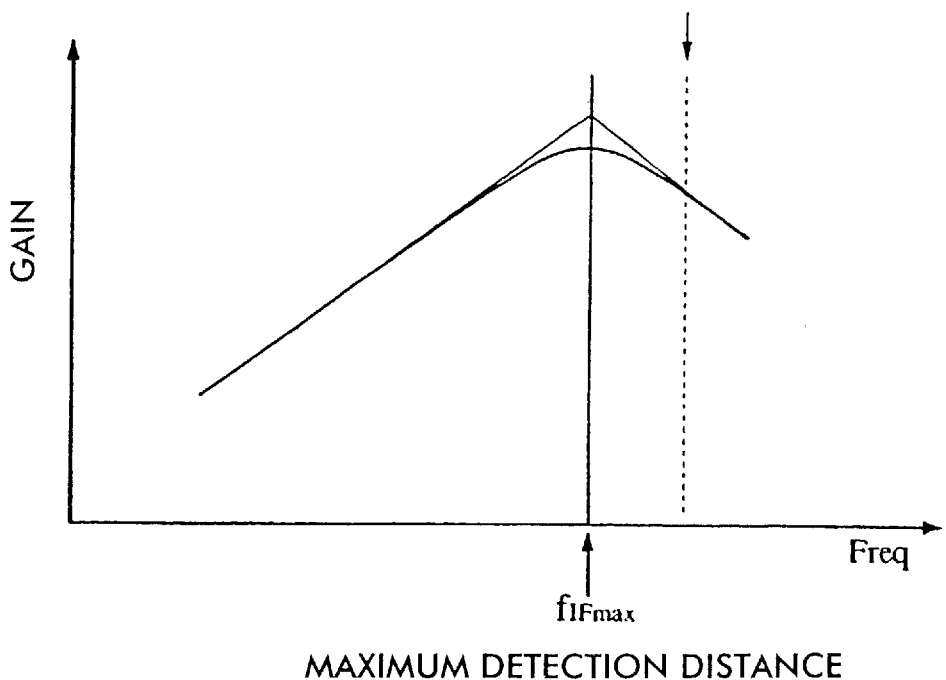
FIG. 4 is a graph showing an example of the gain-frequency characteristics of an IF amplifier circuit.

FIG. 4 shows the gain-frequency characteristics of the IF amplifier circuit 7 shown in FIG. 1. At frequencies lower than a frequency $f_{IFmax}$ of an IF signal which is generated when a reflection wave from a distance corresponding to one half of the sampling frequency, or preferably, a distance therewithin determined as a maximum detection distance, is received, the gain of the IF amplifier circuit 7 increases as the frequency becomes higher; whereas the gain decreases at frequencies above $f_{IFmax}$.

Figure 5:
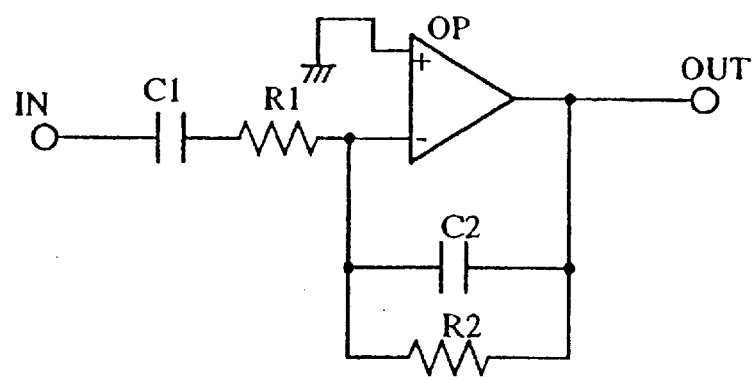
FIG. 5 is a diagram showing an example of an IF amplifier circuit.

FIG. 5 shows an example of an IF amplifier circuit which exhibits the frequency characteristics described above. In FIG. 5, OP indicates a differential amplifier circuit (hereinafter referred to as an OP amp.) implemented by a low-noise signal amplifier. Between the input terminal IN of the IF amplifier circuit and the inverting input of the OP amp. OP, a series circuit of a capacitor C1 and a resistor R1 is connected. Furthermore, between the output terminal of the OP amp. OP and the inverting input terminal thereof, a parallel circuit of a capacitor C2 and a resistor R2 is connected. The non-inverting input of the OP amp. OP is grounded.

According to this construction, when the capacitance value of the capacitor C1 is C1, and the impedance value of the resistor R1 is R1, attenuation is achieved in frequencies below the cutoff frequency fc1 determined by fc1=1/(2πC1·R1). Furthermore, when the capacitance value of the capacitor C2 is C2, and the impedance value of the resistor R2 is R2, attenuation is achieved in frequencies above the cutoff frequency fc2 determined by fc2=1/(2πC2·R2). When the cutoff frequency fc1 for low-frequency attenuation and the cutoff frequency fc2 for high-frequency attenuation are set preferably at the frequency $f_{IFmax}$ shown in FIG. 4, the inverted V-shaped frequency characteristics shown in FIG. 4 are achieved.

Next, the construction of a radar according to a second embodiment will be described with reference to FIGS. 6 to 8.

Figure 6:
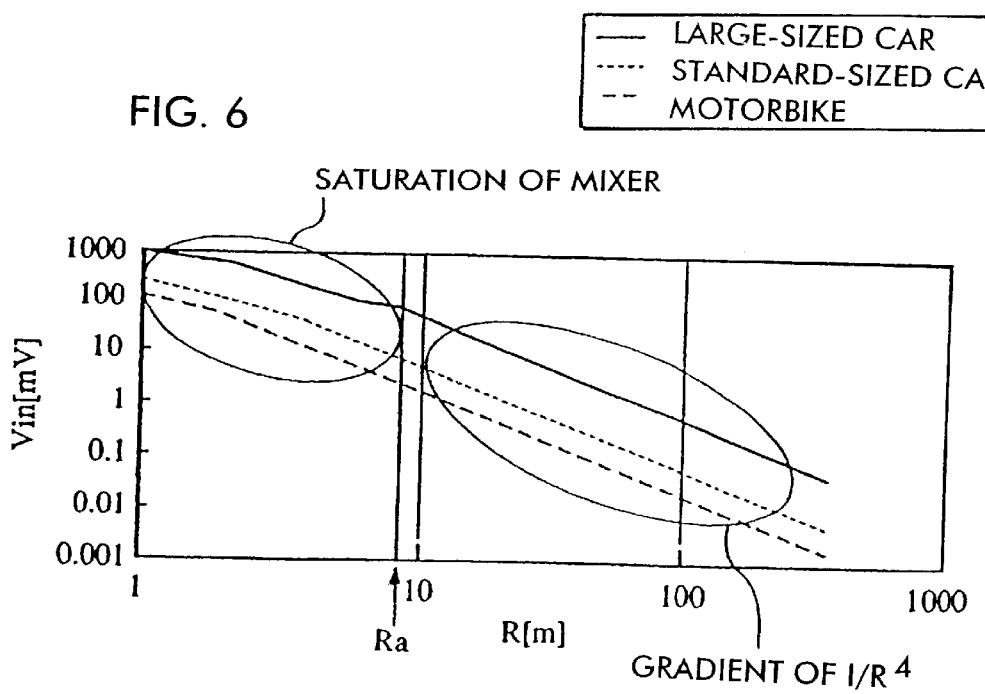
FIG. 6 is a graph showing an example of variation in input voltage to an IF amplifier circuit in accordance with variation of the distance of a target from the radar according to a second embodiment.

FIG. 6 shows an example of variation in input signal Vin to the IF amplifier circuit 7 shown in FIG. 1 in relation to the distance R of a target from an antenna. As shown in FIG. 6, the level of reception signal varies in accordance with the size of the target, such as a large-sized car, a standard-sized car, and a motorbike. The input signal Vin also varies accordingly at a gradient of $1/R^4$. However, when a reflection signal from a nearby target is received, in the case of a large-sized car, at a distance nearer than a distance Ra, as the level of reception signal increases, a saturation is caused due to the characteristics of the mixer 6, causing the gradient of Vin relative to the distance R to be less steep than $1/R^4$. Thus, if the gain monotonously increases as the frequency rises as in the related art, a sufficient sensitivity is not achieved at short distances, namely when receiving low frequency IF signals, inhibiting detection of a small target at a short distance. Accordingly, the IF amplifier circuit is implemented so as to have frequency characteristics in which the insufficiency in the gain at a distance shorter than the distance which causes a saturation of the mixer is compensated.

Figure 7:
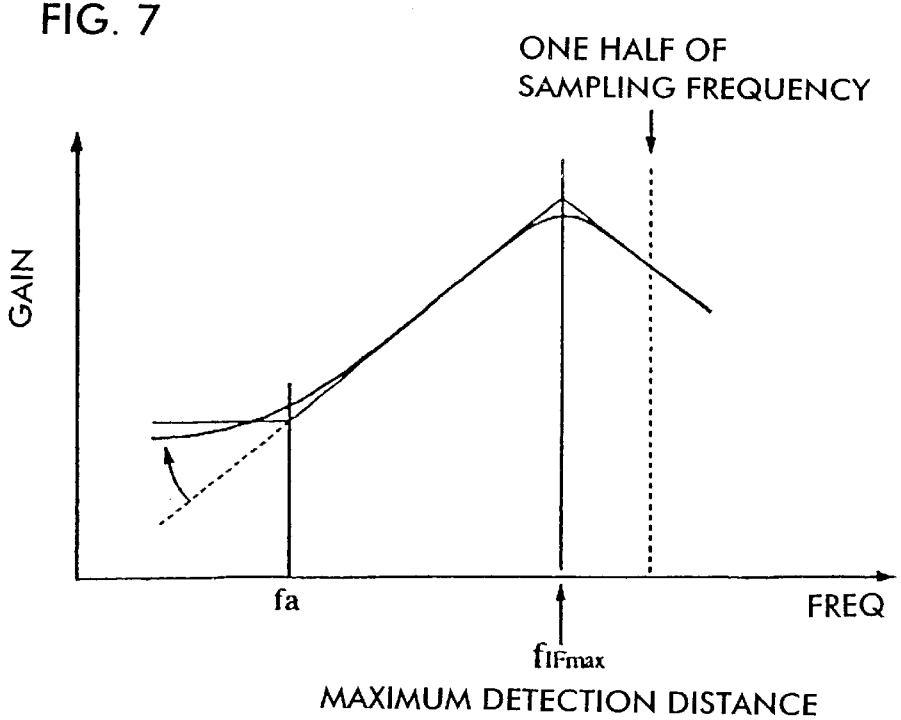
FIG. 7 is a graph showing an example of the gain-frequency characteristics of the IF amplifier circuit in the radar according to the second embodiment.

FIG. 7 shows an example of the frequency characteristics of the IF amplifier circuit. In FIG. 7, the frequency fa is the frequency of an IF signal corresponding to the threshold distance Ra shown in FIG. 6 at which the saturation of the mixer begins. The IF amplifier circuit exhibits the same frequency characteristics as shown in FIG. 4 at frequencies higher than the frequency fa, and the ratio of change in the gain relative to change in the frequency is made smaller at frequencies lower than fa.

However, an output voltage of the IF amplifier circuit 7 must be within the maximum input voltage $V_{ADmax}$ of an AD converter to which the output voltage is input. If the output voltage over the maximum voltage $V_{ADmax}$ is exceeded, the AD converter overflows, and an image signal is generated as a result of FFT. The image signal causes a target to been seen as if it were at a distance corresponding to the image frequency, causing an erroneous operation of the radar. Thus, the maximum allowable gain Amax of the IF amplifier circuit 7 is determined so that the condition of Amax≦$V_{ADmax}$Vin is satisfied for each frequency, wherein Vin indicates a value in a case where a target having a maximum assumed scattering cross section is present.

Figure 8:
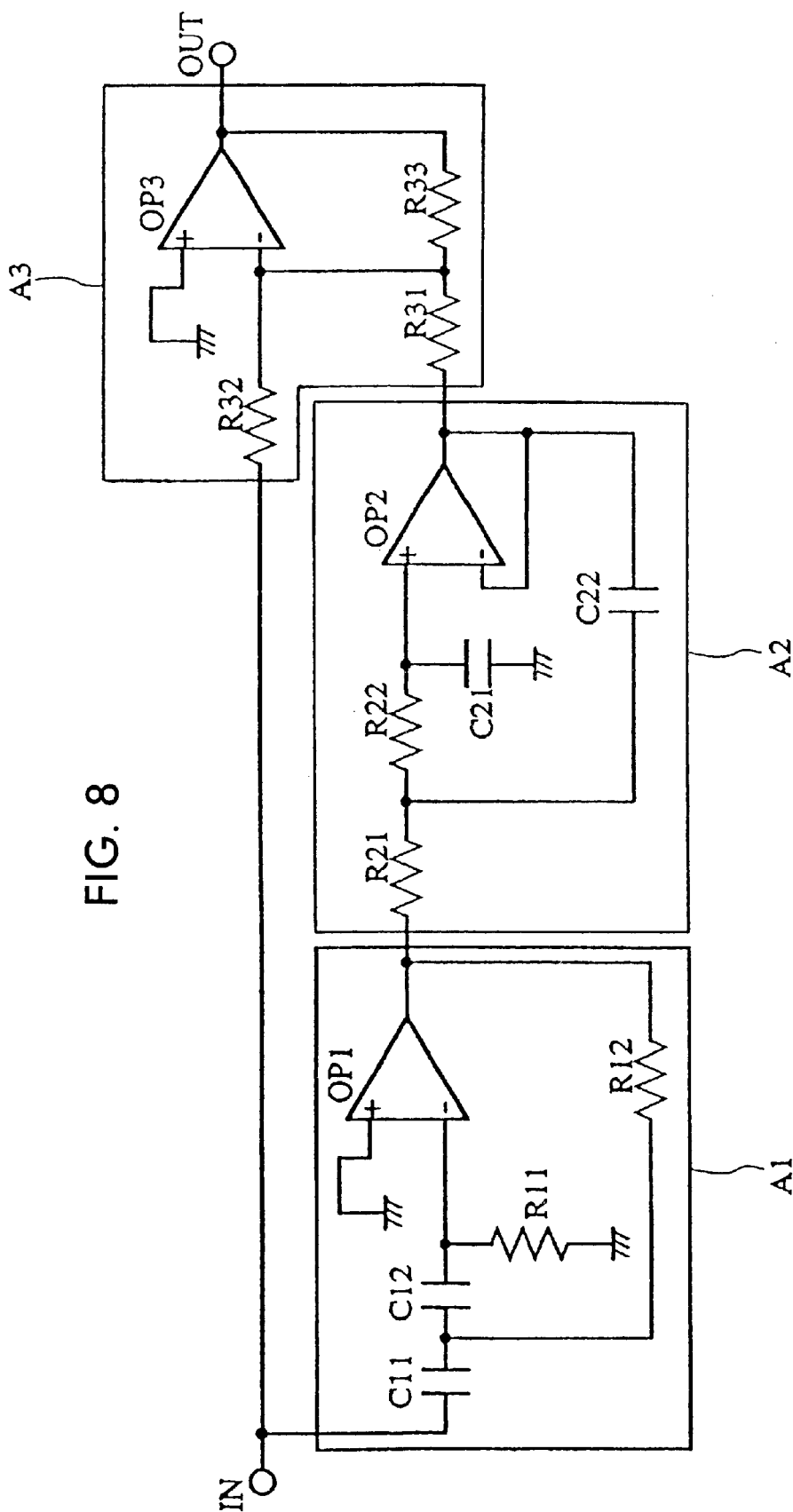
FIG. 8 is a diagram showing an example implementation of an IF amplifier circuit which achieves the characteristics shown in FIG. 7.

FIG. 8 shows an example implementation of an IF amplifier circuit which achieves the frequency characteristics described above. Referring to FIG. 8, a circuit portion A1 comprises capacitors C11 and C12, resistors R11 and R12, and an OP amp. OP1, achieving low-frequency attenuation in accordance with the RC constant. The cutoff frequency is set preferably at the frequency $f_{IFmax}$ shown in FIG. 7. Furthermore, a circuit portion indicated by A2 comprises resistors R21 and R22, capacitors C21 and C22, and an OP amp. OP2, achieving high-frequency attenuation in accordance with the RC constant. The cutoff frequency is also set preferably at the frequency $f_{IFmax}$ shown in FIG. 7.

A circuit portion indicated by A3 comprises resistors R31, R32, and R33, and an OP amp. OP3, forming an adder-amplifier circuit. Thus, combined frequency characteristics, flat at frequencies lower than the frequency fa and inverted V-shaped with the peak at $f_{IFmax}$ at the frequency fa or above, are obtained.

Next, the construction of a radar according to a third embodiment will be described with reference to FIGS. 9 and 10.

Figure 9:
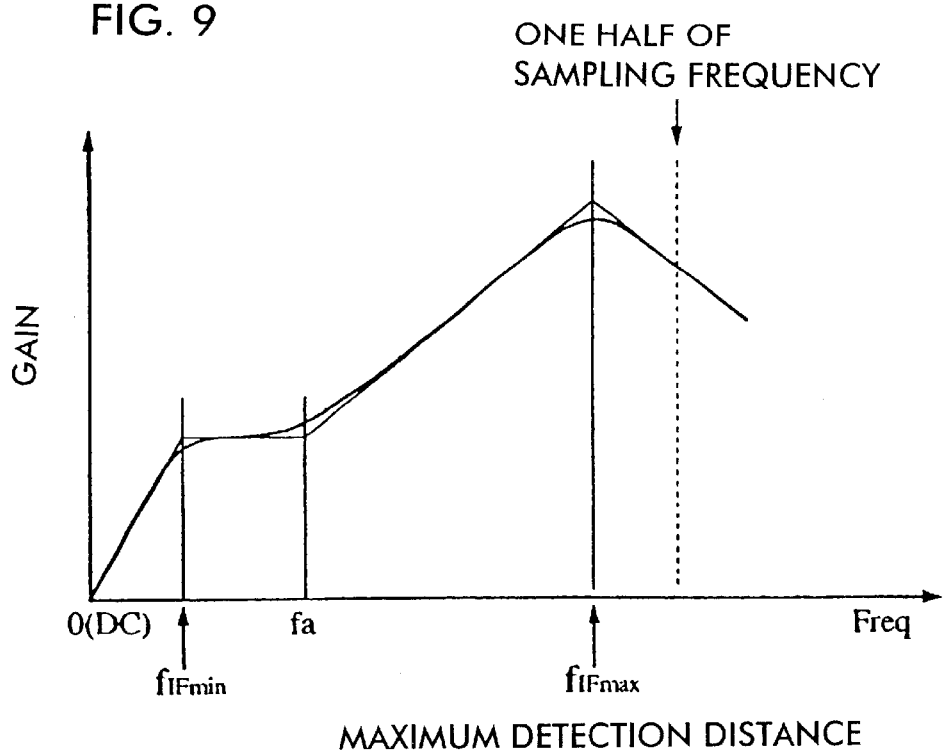
FIG. 9 is a graph showing the gain-frequency characteristics of an IF amplifier circuit in a radar according to a third embodiment.

FIG. 9 shows an example of the gain-frequency characteristics of an IF amplifier circuit. Although characteristics at zero frequency, i.e., DC, and in the vicinity thereof are not shown in FIG. 7, as already described in the related art section, DC component or components in the vicinity thereof, if included in an IF signal, may degrade sensitivity, deteriorate SN ratio, and cause an erroneous detection. Thus, as shown in FIG. 9, the characteristics are such that the gain is zero at DC and the gain is decreased at frequencies lower than the frequency $f_{IFmin}$ of an IF signal corresponding to a minimum (shortest) detection distance.

Figure 10:
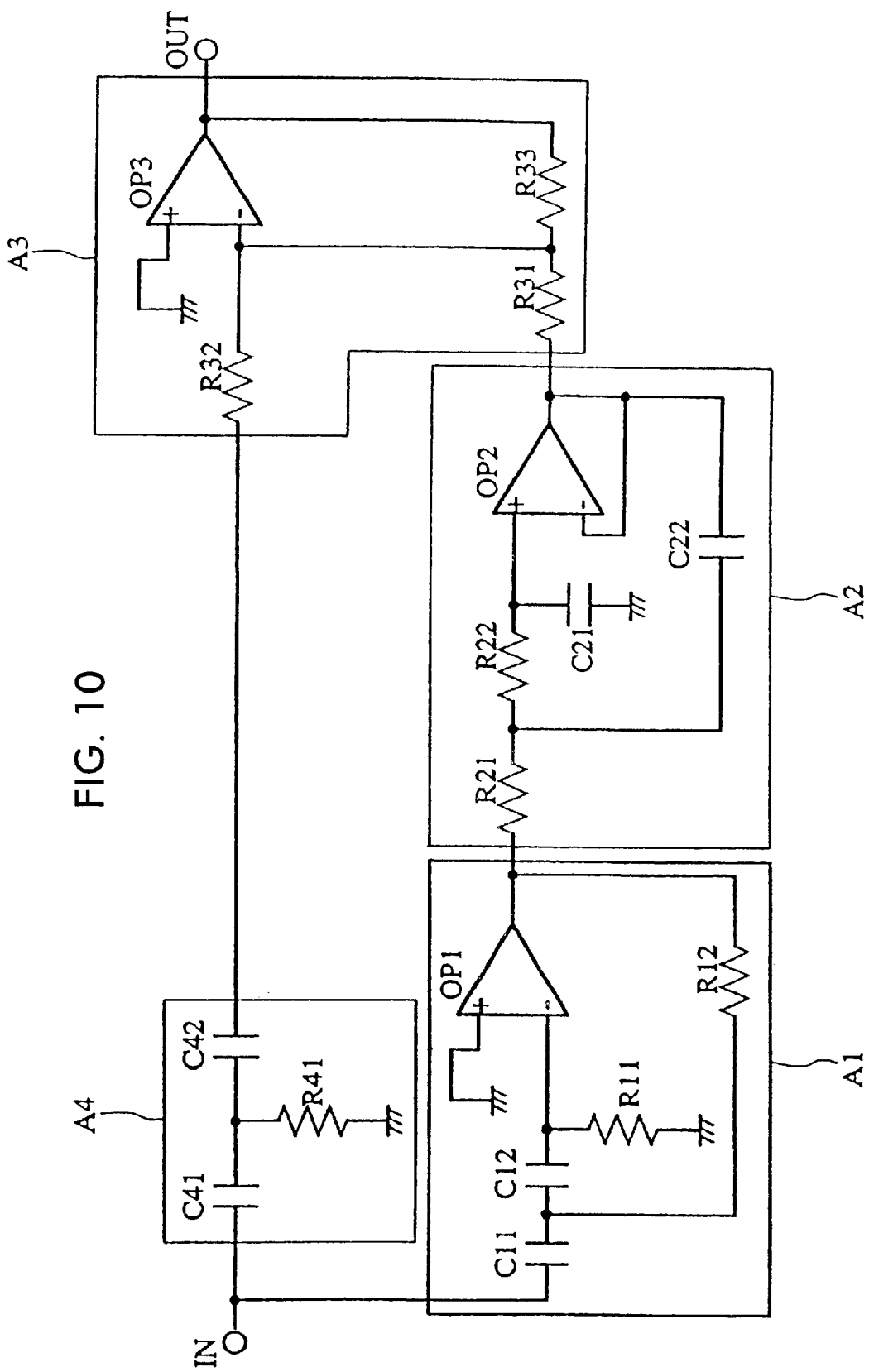
FIG. 10 is a diagram showing an example implementation of an IF amplifier circuit which achieves the characteristics shown in FIG. 9.

FIG. 10 shows an example implementation of an IF amplifier circuit which exhibits the gain-frequency characteristics shown in FIG. 9. In FIG. 10, A4 is a circuit comprising capacitors C41 and C42 and a resistor R41, which attenuates lower frequencies. The constructions of the portions indicated by A1, A2, and A3 are the same as those indicated by the same characters in FIG. 8. The characteristics shown in FIG. 9 in a range of zero frequency to the vicinity of the frequency $f_{IFmin}$ are achieved by the characteristics of the circuit portion indicated by A4 in FIG. 10.

Next, the construction of a radar according to a fourth embodiment will be described with reference to FIG. 11.

Figure 11:
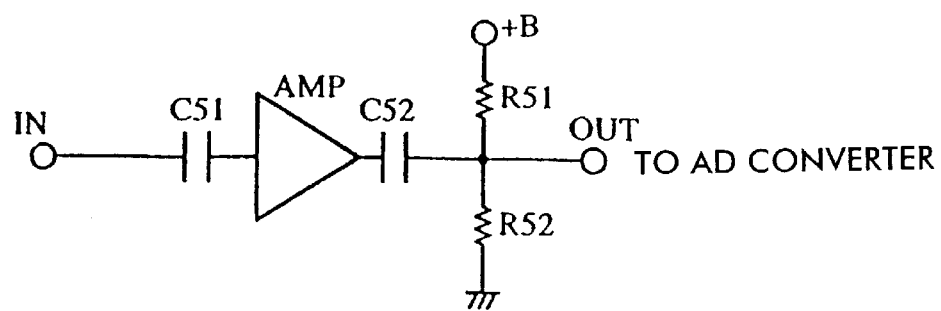
FIG. 11 is a diagram showing an example implementation of an IF amplifier circuit in a radar according to a fourth embodiment.

FIG. 11 shows an example implementation of an IF amplifier circuit. In FIG. 11, AMP is an amplifier circuit which exhibits the gain-frequency characteristics shown in FIG. 7.

Referring to FIG. 11, a capacitor C51 is provided at the input of the amplifier circuit AMP. The capacitor C51 inhibits or blocks DC component and components in the vicinity thereof from entering the amplifier circuit AMP. By removing DC component and low-frequency components in the vicinity thereof from an input signal to the amplifier circuit AMP as described above, frequency characteristics similar to those shown in FIG. 9 are achieved.

At the output of the amplifier circuit AMP, an offset circuit comprising a capacitor C52 and resistors R51 and R52 is provided. The resistors R51 and R52 provide a DC offset to an output signal from the amplifier circuit AMP. The capacitor C52 prevents the DC offset voltage from being applied to the output of the amplifier circuit AMP. Thus, if the AD converter operates from a single power supply with an input voltage range of 0 to +B, an IF signal is input to the AD converter as an AC component centered at the center voltage of the input voltage range. For example, if the input voltage range of the AD converter is 0 to +2 V, and if a stable power supply of +5 V is divided to one fifth by the resistors R51 and R52, the amplitude of an IF signal to the AD converter alternates with +1 V as the center.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A radar for detecting the distance to a target based on the frequency difference between a transmission signal and a reception signal, said radar comprising:
   a transmission circuit for generating a frequency-modulated transmission signal whose frequency varies in time;
   a mixer circuit for generating an IF signal as an output signal representing a frequency difference between the reception signal and the transmission signal;
   an amplifier circuit for amplifying the IF signal, a gain thereof having its peak at or below a frequency corresponding to one half of a predetermined sampling frequency of an AD converter coupled to an output of the amplifier circuit; and
   the AD converter sampling the IF signal at the predetermined sampling frequency and converting the IF signal from an analog signal to a digital signal.

2. The radar according of claim 1, wherein the gain of said amplifier circuit increases as the frequency rises in a range of at or below one half of the sampling frequency.

3. The radar of claim 2, wherein, within a maximum allowable range of input voltage to an AD converter for converting an output signal from said amplifier circuit into digital data, a ratio of change in the gain of said amplifier relative to a change in the frequency of the IF signal is reduced in a frequency range of the IF signal in which the output signal of said mixer saturates as the distance to the target becomes shorter.

4. The radar of claim 1, wherein, within a maximum allowable range of input voltage to an AD converter for converting an output signal from said amplifier circuit into digital data, a ratio of change in the gain of said amplifier relative to a change in the frequency of the IF signal is reduced in a frequency range of the IF signal in which the output signal of said mixer saturates as the distance to the target becomes shorter.

5. A radar for detecting the distance to a target based on the frequency difference between a transmission signal and a reception signal, said radar comprising:
   a transmission circuit for generating a frequency-modulated transmission signal whose frequency varies in time;
   a mixer circuit for generating an IF signal as an output signal representing a frequency difference between the reception signal and the transmission signal;

an amplifier circuit for amplifying the IF signal, a gain of the IF signal having a peak at or below a frequency corresponding to one half of a predetermined sampling frequency;

a DC blocking circuit provided at an input of said amplifier circuit; and an offset circuit for adding a predetermined DC offset, provided at an output of said amplifier circuit.

6. The radar according of claim 5, wherein the gain of said amplifier circuit increases as the frequency rises in a range of at or below one half of the sampling frequency.

7. The radar of claim 5, wherein, within a maximum allowable range of input voltage to an AD converter for converting an output signal from said amplifier circuit into digital data, a ratio of change in the gain of said amplifier relative to a change in the frequency of the IF signal is reduced in a frequency range of the IF signal in which the output signal of said mixer saturates as the distance to the target becomes shorter.

8. A radar for detecting the distance to a target based on the frequency difference between a transmission signal and a reception signal, said radar comprising:

a transmission circuit for generating a frequency-modulated transmission signal whose frequency varies in time;

a mixer circuit for generating an IF signal as an output signal representing a frequency difference between the reception signal and the transmission signal;

an amplifier circuit for amplifying the IF signal, a gain thereof having its peak at or below a frequency corresponding to one half of a predetermined sampling frequency of an AD converter coupled to an output of the amplifier circuit;

the AD converter sampling the IF signal at the predetermined sampling frequency and converting the IF signal from an analog signal to a digital signal;

a first DC blocking circuit provided at an input of said amplifier circuit;

a second DC blocking circuit provided at the output of said amplifier circuit; and an offset circuit, provided at the output of said amplifier circuit, for adding a predetermined DC offset to a signal from which a DC component has been removed by said second DC blocking circuit.

9. The radar according of claim 8, wherein the gain of said amplifier circuit increases as the frequency rises in a range of at or below one half of the sampling frequency.

10. The radar of claim 8, wherein, within a maximum allowable range of input voltage to an AD converter for converting an output signal from said amplifier circuit into digital data, a ratio of change in the gain of said amplifier relative to a change in the frequency of the IF signal is reduced in a frequency range of the IF signal in which the output signal of said mixer saturates as the distance to the target becomes shorter.

11. A radar for detecting the distance to a target based on the frequency difference between a transmission signal and a reception signal, said radar comprising:

a transmission circuit for generating a frequency-modulated transmission signal whose frequency varies in time;

a mixer circuit for generating an IF signal representing a frequency difference between the reception signal and the transmission signal;

an amplifier circuit for amplifying the IF signal, a gain thereof having its peak at or below a frequency corresponding to one half of a predetermined sampling frequency of an AD converter coupled to an output of the amplifier circuit; and the AD converter sampling the IF signal at the predetermined sampling frequency and converting the IF signal from an analog signal to a digital signal, said amplifier circuit having a gain/frequency characteristic such that the gain of the IF signal increases from a preset frequency to a frequency defining a maximum detection distance, has a substantially constant gain from a frequency defining a minimum detection distance to the preset frequency, and wherein the gain of the IF signal decreases below the frequency defining the minimum detection distance.

12. The radar of claim 11, wherein the preset frequency is a frequency below which the mixer circuit coupled to an input of said amplifier circuit begins to saturate.

13. A radar for detecting the distance to a target based on the frequency difference between a transmission signal and a reception signal, said radar comprising:

a transmission circuit for generating a frequency-modulated transmission signal whose frequency varies in time;

a mixer circuit for generating an IF signal representing a frequency difference between the reception signal and the transmission signal;

an amplifier circuit for amplifying the IF signal;

a DC blocking circuit provided at an input of said amplifier circuit; and an offset circuit for adding a predetermined DC offset, provided at an output of said amplifier circuit, said amplifier circuit having a gain/frequency characteristic such that the gain of the IF signal increases from a preset frequency to a frequency defining a maximum detection distance, has a substantially constant gain from a frequency defining a minimum detection distance to the preset frequency, and wherein the gain of the IF signal decreases below the frequency defining the minimum detection distance.

14. The radar of claim 13, wherein the preset frequency is a frequency below which the mixer circuit coupled to an input of said amplifier circuit begins to saturate.

15. A radar for detecting the distance to a target based on the frequency difference between a transmission signal and a reception signal, said radar comprising:

a transmission circuit for generating a frequency-modulated transmission signal whose frequency varies in time;

a mixer circuit for generating an IF signal representing a frequency difference between the reception signal and the transmission signal;

an amplifier circuit for amplifying the IF signal, a gain thereof having its peak at or below a frequency corresponding to one half of a predetermined sampling frequency of an AD converter coupled to an output of the amplifier circuit;

the AD converter sampling the IF signal at the predetermined sampling frequency and converting the IF signal from an analog signal to a digital signal;

a first DC blocking circuit provided at an input of said amplifier circuit;

a second DC blocking circuit provided at the output of said amplifier circuit; and an offset circuit, provided at the output of said amplifier circuit, for adding a predetermined DC offset to a signal from which a DC component has been removed by said second DC blocking circuit;

said amplifier circuit having a gain/frequency characteristic such that the gain of the IF signal increases from a preset frequency to a frequency defining a maximum detection distance, has a substantially constant gain from a frequency defining a minimum detection distance to the preset frequency, and wherein the gain of the IF signal decreases below the frequency defining the minimum detection distance.

16. The radar of claim 15, wherein the preset frequency is a frequency below which the mixer circuit coupled to an input of said amplifier circuit begins to saturate.

* * * * *